(12) United States Patent  (10) Patent No.: US 7,458,924 B1
Anderson  (45) Date of Patent: Dec. 2, 2008

(54) FRAME FOR DANCE PLATFORM

(76) Inventor: Ladd Anderson, 4055 S. 1610 East, Salt Lake City, UT (US) 84124

( * ) Notice: Subject to any disclaimer, the term of this patent is extended or adjusted under 35 U.S.C. 154(b) by 0 days.

(21) Appl. No.: 11/518,262

(22) Filed: Sep. 8, 2006

Related U.S. Application Data

(60) Provisional application No. 60/715,316, filed on Sep. 8, 2005.

(51) Int. Cl.
    *A63B 71/00* (2006.01)
(52) U.S. Cl. ...................................... 482/148
(58) Field of Classification Search ................ 482/148; 381/361; 463/36; 84/600, 644.5, 670, 718, 84/464 R; 36/139
    See application file for complete search history.

(56) References Cited

U.S. PATENT DOCUMENTS

| 4,778,027 | A * | 10/1988 | Taylor ......................... 181/175 |
| 6,913,318 | B2 * | 7/2005 | Higley et al. ................. 297/383 |
| 6,923,773 | B2 * | 8/2005 | Leivseth et al. ............... 601/27 |
| 7,303,508 | B2 * | 12/2007 | Toyama et al. ................ 482/51 |
| 2003/0205873 | A1 * | 11/2003 | Orozco ................... 280/33.991 |

OTHER PUBLICATIONS

Printout from web page: http://us.st11.yimg.com/us.st.yimg.com/1/ddrgame_1910_9870819.
Printout from web page: http://us.st11.yimg.com/us.st.yimg.com/1/ddrgame_1912_3675714.

* cited by examiner

*Primary Examiner*—Lori Amerson
(74) *Attorney, Agent, or Firm*—Brian C. Trask

(57) ABSTRACT

A frame for use with a removable switch-carrying platform during machine dance activity. The frame includes a horizontal member that serves as an anchor, and typically is disposed below the platform. An upstanding member, typically cantilevered from the anchor, may be provided to hold a trickbar, or a video display device. Sometimes, two upstanding members are provided, each at opposite front and rear ends of an installed platform, to hold a trickbar and a display device, respectively. The frame may be configured to accommodate either a single-user or dual-users. In a preferred arrangement, the frame is modular, to permit a user to form: 1) only a trickbar, 2) a trickbar in combination with a display holder, and 3) a dual-user platform. A modular dual-user platform may include a trickbar for either, both, or none of the dance platforms, as desired.

20 Claims, 3 Drawing Sheets

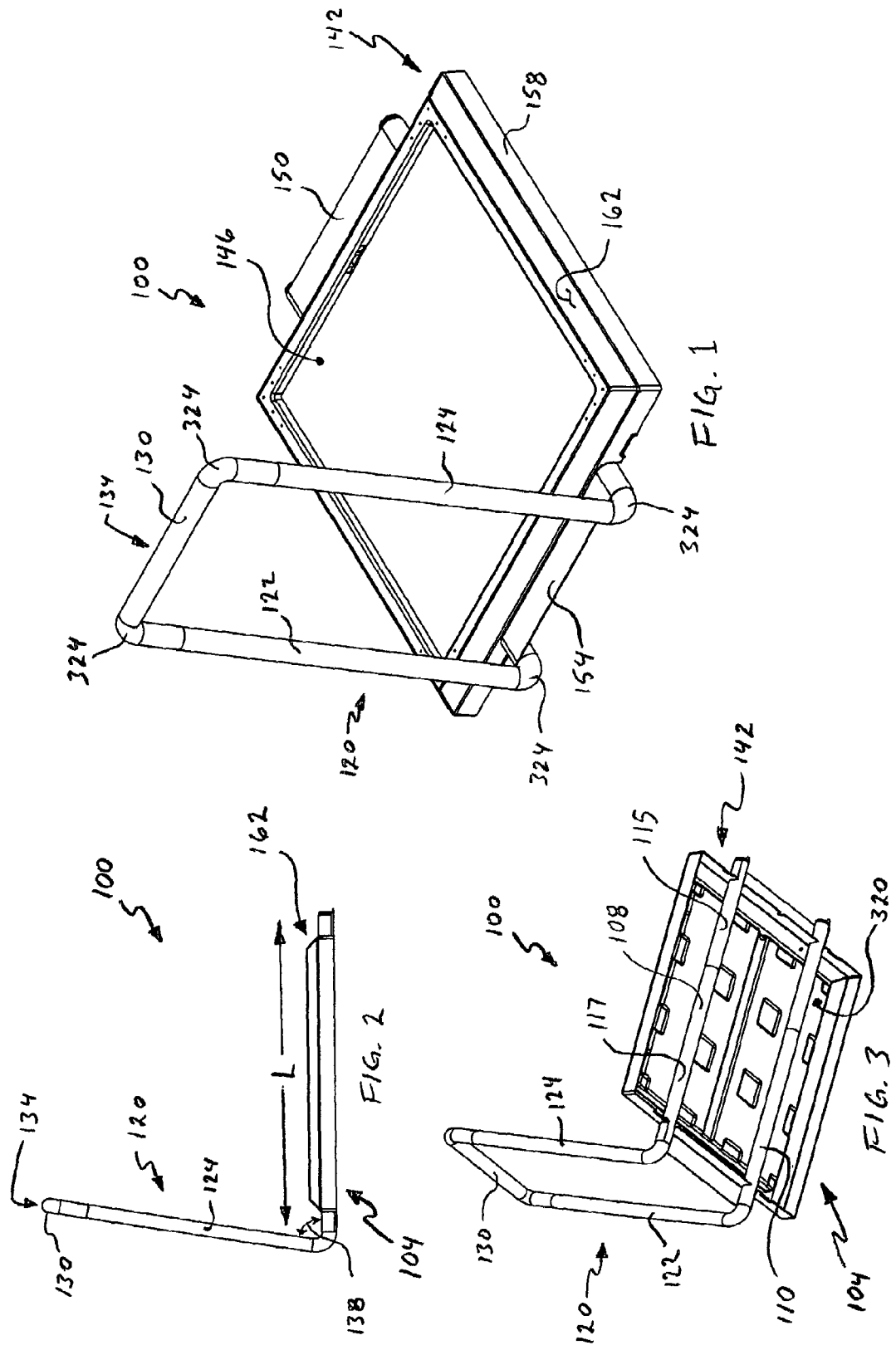

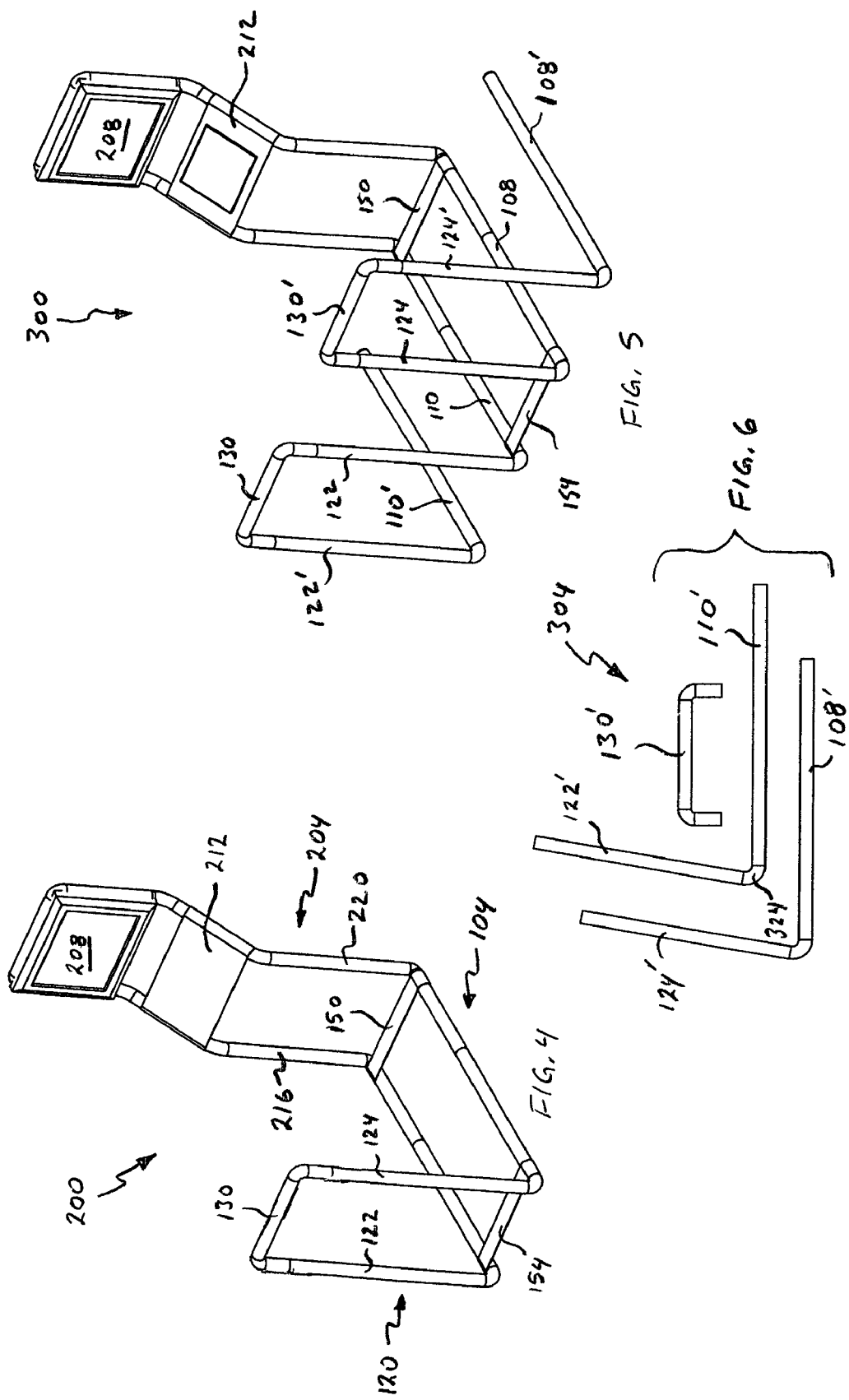

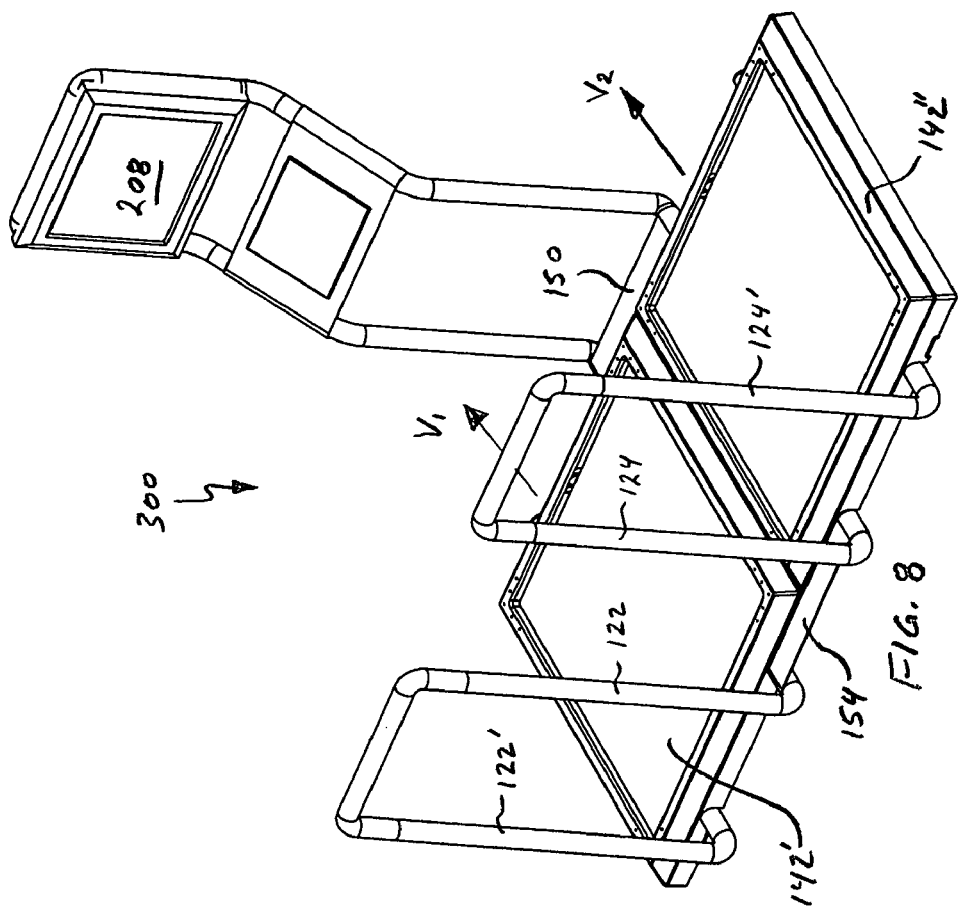
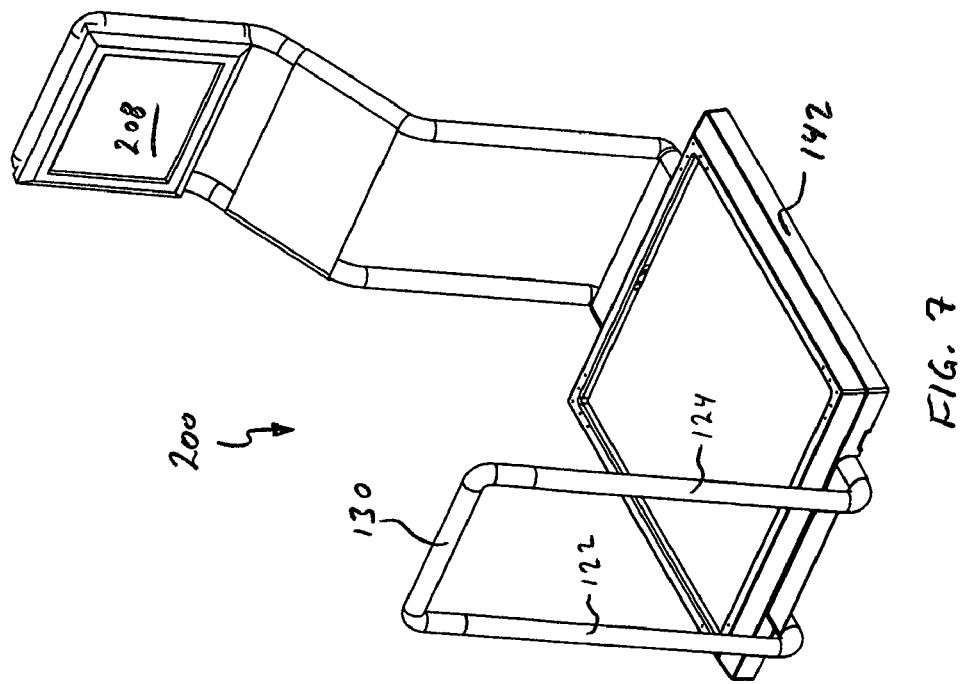

FRAME FOR DANCE PLATFORM

RELATED APPLICATIONS

This application claims the benefit under 35 U.S.C. 119(e) of the filing date of Provisional Application Ser. No. 60/715,316, filed Sep. 8, 2005, for "EXERCISE PLATFORM ASSEMBLY", the entire disclosure of which is incorporated as though set forth in its entirety herein.

BACKGROUND

1. Field of the Invention

This invention relates to support structures associated with switch-carrying platforms of the type used in machine dance activities. It is particularly directed to an improved frame for use in removable combination with such platforms.

2. State of the Art

Machine dance platforms, holding normally-open switches in a fixed arrangement for activation of a selected switch by placement of a user's foot, are disclosed in U.S. Pat. Nos. 6,227,968 and 6,410,835 to Suzuki et al. Such platforms are used commercially in a competitive game format. A machine dance platform includes nine tiles that are approximately 11 inches square; arranged in three rows of three tiles each, in a tic-tac-toe type pattern. Each tile represents a place for a user, or platform operator, to stand. Indicia, such as arrows, are displayed on certain tiles. The user of such a dance platform tries to stand on proscribed indicia in accordance with instructions visible on an associated video display. The video display is mounted for viewing by the platform operator. In a competitive arrangement, a pair of dance platforms are disposed in side-by-side harmony so that a pair of users can see the video display at the same time. An output caused by switch activation is provided from each platform as feedback to a controller operable to evaluate a user's performance.

Machine dance has been popularized in an arcade format, wherein a large framework is provided in which to hold a pair of dance platforms in fixed association with a controller and video display. The arcade assembly typically includes a trickbar, on which users may support a portion of their weight to perform advanced machine dance maneuvers. The elements are necessarily maintained in fixed association to resist theft of components.

As an offshoot from the arcade version, a home version of machine dance activity has been developed. The home version typically employs software running on a game controller, such as a Microsoft X-box™, or a Sony Playstation™, in association with a portable dance platform. A variety of dance platforms are commercially available, including "hard" and "soft" platforms. A hard dance platform typically includes a substantially rigid foundation, like a wooden board. In contrast, certain soft platforms may be rolled-up when not deployed for use. The portable platform is simply placed on the floor, and connected for communication to the game controller. The game controller typically is connected to a television set to provide the video input for the user. Unfortunately, the location of the user's television set is generally determined by recreational viewing, and therefore typically is not optimized for machine dance activity.

In an attempt to further re-create the arcade experience, an attempt has been made to provide a commercial embodiment of a trickbar for association with a portable dance platform. At least two versions of a metal dance platform including a handle bar are illustrated on the web site: http://www.ddrgame.com. Such platforms appear to be manufactured by iON, and include a pair of upstanding poles supporting a horizontal handle bar. In one version, the upstanding poles appear to be inserted into sockets carried by the metal platform. Another version additionally includes a rearward-projecting support truss disposed at the bottom of the poles.

It would be an improvement in the art to provide a frame, for association with a portable dance platform selected from a plurality of different manufacturers, which provides a solid and stable support for a trickbar. It would further improvement to provide a frame for association with a portable dance platform that is adapted to hold a video display in a position that substantially re-creates an arcade setting.

BRIEF SUMMARY OF THE INVENTION

This invention provides a frame for use with a removable switch-carrying platform during machine dance activity. Sometimes, the switch-carrying platform may be made reference to as a dance platform. Such platforms include an activation surface with a plurality of designated portions corresponding to normally-open, foot actuated switches. A frame constructed according to certain principles of the instant invention may beneficially be used to enhance a user's machine dance experience, regardless of the make or model of their dance platform.

The frame includes an anchor member that has a length which, in general, is at least substantially in agreement with a length of the dance platform. The length of the anchor member provides a measure of stability to the frame, and desirably helps resist rotation about an axis normal to its horizontal length. In certain preferred embodiments, the anchor member is disposed underneath an installed dance platform. However, in one alternative embodiment within contemplation, an anchor member can be disposed about a perimeter of the platform.

The frame also includes a first upstanding member associated with the anchor member. Typically, the first upstanding member is disposed in cantilevered relation from the anchor member. Sometimes, a brace member is associated with the first upstanding member to provide a substantially horizontal portion of the brace member that is vertically spaced apart from the activation surface. One operable such brace forms a "trickbar", which enables an advanced user to perform certain machine dance maneuvers. Desirably, to enhance stability, a vertical plane passing through the horizontal portion intersects the anchor member at some point between its opposite ends. One way to accomplish such an arrangement is to form an acute angle between the first upstanding member and the horizontal member.

One embodiment of a frame includes holding structure, associated with the first upright member, which is configured and arranged to hold a display terminal at a viewable elevation for a user standing upon the platform. In addition, a second upstanding member can be associated with the anchor member at an opposite side of the platform to hold a trickbar. Certain preferred embodiments of a frame includes an anchor member that may be arranged to receive a pair of platforms in side-by-side operable juxtaposition to enable a pair of users to simultaneously view the same display terminal. In one currently preferred frame, the anchor member is configured and arranged for removable modular assembly to permit user modification effective to form either of a single-user or dual-user assembly. That is, the modular frame may be configured to provide: 1) only a trickbar, 2) a trickbar and a display holder, and 3) a dual-user platform. The dual-user platform may include a trickbar for either, both, or none of the dance platforms, as desired.

Desirably, a frame includes retaining structure configured and arranged to resist horizontal motion of an installed dance platform in a direction along a first axis. It is also desirable for a frame to include retaining structure configured and arranged to resist horizontal motion of an installed platform in a direction normal to the first axis. Exemplary such retaining structures nonexclusively include brackets, walls, and a tub.

A currently preferred tub may be disposed in association with the horizontal member and is generally configured to provide a socket in which to receive a dance platform. A currently preferred socket resists undesirable horizontal movement of a dance platform during machine dance activity. One such tub can be dropped, or lowered, over the top of the anchor member. It is further desirable for the tub to provide edge structure, disposed about a portion of a perimeter of the socket, which is arranged to provide a tapered transition, between a support surface and the activation surface of the platform installed in the socket, effective to resist injury to an ankle of a user who steps upon the edge structure. Sometimes, structure associated with the tub is configured to provide a resilient cushion to resist imparting repetitive contact stress injury to a user of the platform.

BRIEF DESCRIPTION OF THE DRAWINGS

In the drawings, which illustrate what are currently considered to be the best modes for carrying out the invention:

FIG. 1 is a view in perspective from above of a currently preferred embodiment constructed according to certain principles of the instant invention;

FIG. 2 is a side view of the embodiment illustrated in FIG. 1;

FIG. 3 is a view in perspective from below of the embodiment illustrated in FIG. 1;

FIG. 4 is a view in perspective from above of a second currently preferred frame embodiment;

FIG. 5 is a view in perspective from above of a third currently preferred frame embodiment;

FIG. 6 is a group view of disassembled modular frame elements, with all illustrated elements being disposed on a common plane;

FIG. 7 is a view in perspective from above of an assembly including the frame illustrated in FIG. 4; and FIG. 8 is a view in perspective from above of an assembly including the frame illustrated in FIG. 5.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of the principles of the present invention, and should not be viewed as narrowing the claims which follow.

For purpose of this disclosure, and unless otherwise obvious in context, the directions: front, rear, left, and right are defined with respect to a user's frame of reference when standing on a machine dance platform that is installed in operable association with a frame. The machine dance platform may be characterized as being activated by a user stepping on one of a plurality of typically rectangular areas indicated on the platform's top surface. In general, the weight of the user stepping on a designated area of the platform causes a switch to close, and a corresponding electrical signal is output for use in a feedback loop. An exemplary such platform is illustrated and described in U.S. patent application Ser. No. 10/879,439, the entire disclosure of which is incorporated by reference as though set forth herein in its entirety. In certain alternative embodiments, a frame constructed according to certain principles of the instant invention may be adapted to receive, and to provide support for its use, any other commercially available multi-switched platform.

A first embodiment, generally indicated at 100, of a frame assembly constructed according to certain principles of the invention is illustrated in FIGS. 1 through 3. The illustrated frame assembly includes an anchor element, generally indicated at 104. Anchor element 104 has a length (L) that desirably is at least substantially in agreement with a length of an installed machine dance platform. The length of the anchor element 104 provides an inherent stability to resist rotation about an axis perpendicular to its length axis.

The illustrated anchor element 104 includes a pair of spaced apart, elongate, cylindrical rods 108 and 110 adapted for disposition underneath an installed dance platform. A workable anchor rod 108, or other element of a frame, can be manufactured from structural steel pipe having a diameter between about ½ inch and about 3 inches, or so. A currently preferred anchor rod 108 is manufactured from 1¼ inch steel pipe. Operable metallic materials for use in forming the illustrated tubular sections include Aluminum, mild carbon steel, stainless steel, and other alloys of ferrous and nonferrous metals. Desirably, a frame made from material such as mild carbon steel is painted, or coated, to resist rust and decay. Other materials may be used for elements in alternative frame construction, including PVC water pipe having sufficient bending stiffness and strength.

Of course it is to be realized that an anchor element 104 may be structured in a variety of ways other than illustrated, as will be apparent to one of ordinary skill in the art. The cross-section of an anchor element may be selected to include other shapes and configurations, including a single structural element. It is within contemplation to form an anchor element 104 from one or more pipe (or tube, plate, etc., having any cross-section), that is suitably braced to resist rotation about its length axis. It is also within contemplation to include additional transversely oriented anchor elements (extend an anchor's footprint in right and left directions), to increase resistance of a frame from tipping. A workable anchor must simply provide a foundation on which upstanding structure may be supported to permit the upstanding structure to perform its intended function.

As illustrated, an anchor rod may be assembled from a plurality of subassembly rod segments. For example, anchor rod 108 may include a forward segment 1115, and a rear segment 117. Any convenient number of such segments may be provided to form any illustrated member or element. When provided, such segments desirably are structured to effect a simple connection there-between, such as a plug-fit engagement. The joint between segments typically includes retaining structure, such as a transversely inserted pin (such as a cotter pin), or fastener (such as a threaded bolt and nut), to resist inadvertent disassembly of the segments. Segments can also simply include male and female portions adapted to be press-fit or threaded together.

At least one upstanding member, generally indicated at 120, is affixed to the anchor 104. It is currently preferred to use a cantilevered arrangement for forming the association between anchor and upstanding member, to minimize an amount of floor space required by the frame. However, any structural arrangement (such as pinned joints stabilized by association of a plurality of beam members), operable to permit the upstanding structure to perform its intended function may be used in alternative embodiments within the ambit of the instant invention.

Illustrated upstanding member 120 includes a pair of spaced apart, left and right rear support elements, 122 and 124, respectively. The rear support elements 122, 124 are associated with a brace element 130, effective to support a substantially horizontal portion, generally indicated at 134, of brace member 130 at a location that is vertically spaced apart from a top surface of an installed dance platform. The illustrated brace member 130 forms one convenient structure that can be grasped behind a user's back, to enable the user to perform certain advanced machine dance movements. Sometimes, the brace member 130 may be made reference to as a "trickbar". It is currently preferred to manufacture upstanding and brace elements from structural steel pipe sized in agreement with the anchor element.

In general, brace member 130 is desirably structured to operate as a stable support for at least a portion of a user's weight. A currently preferred configuration effective to enhance stability of the support 130 includes forming an acute angle 138 between the anchor 104 and upstanding member 120 (see FIG. 2). Such angle serves to position the vertical member away from likely contact with a user's heel, and also disposes surface 134 at a desired location, elevated and near the rear edge of the platform, effective to enhance stability. Desirably, a vertical plane passing through the brace member 130 will intersect the anchor somewhere between its opposite ends. In such case, a moment arm effective to resist tipping of the frame is inevitably formed.

While the upstanding member and trickbar may (in an alternative embodiment), be formed as a "T-bar", it is currently preferred to use a spaced apart pair of bars 122, 124 to further reduce chance of a user's heel encountering the vertical member during machine dance activity. Further, it is currently preferred to dispose the trickbar behind a user's standing position on a platform, to reduce likelihood of the user striking their hands on the support surface 134 during machine dance activity in which surface 134 is not employed.

In general, a frame will include structure arranged for removable reception of an associatable dance platform. Further, it is desirable for a frame to include retention structure adapted to resist relative motion between the frame and an installed platform. One currently preferred such reception structure includes a tub, generally indicated at 142 in FIGS. 1 and 3. Tub 142 includes socket 146 in which a machine dance platform may be placed. Socket 146 includes a floor on which to receive either a hard-type, or a soft-type of commercially available dance platform. Desirably, walls of socket 146 conform in substantial agreement with a perimeter of the dance platform to resist relative motion between the platform and tub 142 during machine dance activity.

A portion of a socket wall is generally adapted to permit communication between an installed platform and a controller. Operable such communication-permitting structure includes a wall having a sufficiently low height to permit an electrical cable or wireless transmitter to communicate with the associated controller. Other operable structure permitting such communication include one or more passageway, slot, or interrupted wall portion.

Forward motion of the tub 142 relative to the anchor 104 is restrained by illustrated front bracket 150. Rearward motion of the tub 142 relative to the anchor 104 is restrained by illustrated rear bracket 154. Such brackets 150, 154 may be permanently affixed to the anchor 104, such as by welding, or may be affixed with removable fasteners. Removable brackets are sometimes desirable to permit shipping a disassembled frame in a reduced volume. Side-to-side motion of the illustrated tub 142 relative to the anchor 104 is resisted by a structural interference between spacer wall 158 and anchor 104.

Naturally, alternative structure adapted to resist undesired motion of a platform during machine dance activity is within contemplation. For nonlimiting examples: it is within contemplation that a platform may be structured to form a direct holding interface to a frame; the frame itself may form a socket by wrapping around a perimeter portion of the platform; the frame may include brackets adapted to hold a platform in the absence of a tub, such brackets can be adjustable to accommodate a plurality of commercially available dance platforms; and other retaining arrangements that will be apparent to one of ordinary skill in the art.

A workable tub 142 may be formed from a material providing sufficient structural integrity to hold a platform in an operable association with a frame. Wood and/or metal could be employed to make operable tubs. However, it is currently preferred to injection mold tubs from injectable plastic or plastic-like materials including ABS, Nylon, PVC, or even rubber. A currently preferred tub can be lowered into engagement with its associated frame.

The tub 142 is desirably configured to enhance safety of a user. The tub 142 may be formed from, or include as a component, resilient material adapted to resist imparting repetitive contact stress injury to a user. It is within contemplation alternatively to provide a separate element, such as a blanket or one or more cushions disposable in socket 146, or between a tub and the floor, to operate as such resilient, shock-reducing element.

Further to enhance safety, a tapered edge structure, generally indicated at 162 in FIG. 2, is desirably disposed about a portion of a perimeter of the socket 142, and may be arranged to provide a tapered transition, between a support surface (such as a floor), and the top or activation surface of a dance platform installed in the socket. Such tapered edge desirably is configured and arranged effective to resist twisting or rolling injury to an ankle of a user who steps upon the edge structure.

A second currently preferred frame embodiment, generally indicated at 200, is illustrated in FIG. 4 and is adapted for a single user. Illustrated frame 200 includes an optional modular rear upstanding member, generally indicated at 120. A front upstanding member, generally indicated at 204, is also included in illustrated frame 200. Front upstanding member 204 is desirably associated with anchor element 104 operably to support a video display 208 at an elevation and angle for comfortable viewing by a user of a platform installed in association with frame 200. Operable display devices 208 include liquid crystal displays (LCDs), plasma screens, and cathode ray tube (CRT) displays, such as a ubiquitous television screen. Typically, upstanding member 204 is cantilevered from anchor 104.

In certain embodiments, a "toe" of anchor 104 may protrude forward from the illustrated attach location to provide additional resistance to tipping of the frame 200 under the weight of a display monitor. However, it is currently preferred to minimize an overall length of a frame to minimize its intrusiveness in a room.

Front upstanding member 204 may sometimes include support structure 212 that is adapted to hold a controller for machine dance activity. Exemplary controllers include a Microsoft X-box™, or a Sony Playstation™. As illustrated, upstanding member 204 includes a pair of spaced apart posts, 216 and 220, respectively. Of course, as with the rear upstanding member 120, a single structural upstanding element is operable in an alternative embodiment within contemplation.

It is desirable for at least certain connections formable between elements, such as a brace 130, and an upstanding member 120, or an upstanding member 120, 204 and an anchor 104, be configured to form a removable coupling between cooperating elements. In particular, is desirable to offer a kit of modular parts which could form either a stand-alone trickbar frame, such as frame 100, or convert a single-user display frame 200 into a dual-user display frame 300 (see FIG. 5). FIG. 6 illustrates a group of such modular components, generally indicated at 304 and individually designated by primed numerals corresponding to similar elements of a single-user frame 100. With reference to FIG. 5, the spacing between illustrated anchor elements 108' and 108, 108 and 110, and 110 and 110' may conveniently be made uniform to permit registration of tub structure when the tub is installed at either a single-user or a dual-user position (see also FIGS. 7 and 8).

It should be realized that a modular single-user frame, similar to frame 200 illustrated in FIGS. 4 and 7, can be modified by removing upstanding member 120 and connecting trickbar 130 directly to the anchor 104, thereby forming a single-user display frame without an elevated trickbar. Similarly, a modular dual-user frame, similar to frame 300 illustrated in FIGS. 5 and 8, may be configured to include an elevated trickbar in association with either, both, or none of the dance platforms, as desired.

Desirably, a frame 100, 200, 300, is manufactured to permit cost-effective shipping to a retailer or other consumer. Therefore, certain preferred embodiments are structured to facilitate user assembly in the field. For example, disassembled rod subassembly elements 115 and 117 advantageously can be packed into a volume having a smaller size than an anchor rod 108 would require. In one preferred arrangement, all anchor and upstanding members may be structured from subassembly components that are individually sized to be received, in a disassembled condition, inside a volume 320 (see FIG. 1) defined by the tub 142. To facilitate forming multiple modular connections, interchangeable corner elements 324 may be structured for reception in association with any or all of the upstanding or anchor elements.

It is further within contemplation for connector structure of a frame 300 to be configured and arranged to permit angular adjustment of forward-facing vectors $V_1$ and $V_2$, respectively, to enable first and second users to look directly at the common display 208 without turning their heads to one side. In such case, a pair each of forward and rear retaining brackets 150, 154, respectively, could be supplied, if desired, for installation of a pair between anchor elements of each of the tubs 142' and 142". In addition, the brackets 150, 154 illustrated in FIGS. 5 and 8 (which span between anchor elements of both tubs) would, of course, be removed or otherwise relocated to permit rotation of the tubs 142' and 142" (about an axis of their corresponding front upstanding element), with respect to the display 208.

While the invention has been described in particular with reference to certain illustrated embodiments, such is not intended to limit the scope of the invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for use in combination with a removable switch-carrying platform having a substantially planar switch-activation surface bounded within a platform width and a platform length, the activation surface being configured to accommodate standing thereon by a user to permit foot actuation of a selected switch by the user, the apparatus comprising:
    an anchor member having a horizontal length, measured along a first axis, which is at least substantially in agreement with said platform length, adapted to resist rotation of said anchor member about an axis normal to said horizontal length; and
    a first upstanding member associated with said anchor member.

2. The apparatus according to claim 1, wherein:
said first upstanding member is disposed in cantilevered relation from said anchor member.

3. The apparatus according to claim 1, further comprising:
a brace member associated with said first upstanding member to provide a substantially horizontal portion of said brace member that is vertically spaced apart from said activation surface.

4. The apparatus according to claim 1, wherein:
said anchor member is adapted for disposition below an installed said platform.

5. The apparatus according to claim 3, wherein:
said horizontal portion of said brace member is disposed such that a vertical plane passing through said horizontal portion intersects said anchor member at some point between opposite ends of said horizontal length.

6. The apparatus according to claim 2, wherein:
said first upstanding member and said horizontal member are arranged to form an acute angle there-between.

7. The apparatus according to claim 1, further comprising:
retaining structure configured and arranged to resist horizontal motion of an installed said platform in a direction along said first axis.

8. The apparatus according to claim 1, further comprising:
retaining structure configured and arranged to resist horizontal motion of an installed said platform in a direction normal to said first axis.

9. The apparatus according to claim 1, further comprising:
a tub disposed in association with said horizontal member and configured to provide a socket in which to receive said platform.

10. The apparatus according to claim 9, wherein:
edge structure disposed about a portion of a perimeter of said socket is arranged to provide a tapered transition, between a support surface and said activation surface of said platform installed in said socket, effective to resist injury to an ankle of a user who steps upon said edge structure.

11. The apparatus according to claim 10, wherein:
structure associated with said tub is configured to provide a resilient cushion to resist imparting repetitive contact stress injury to a user of said platform.

12. The apparatus according to claim 1, further comprising:
holding structure, associated with said first upright member, which is configured and arranged to hold a display terminal at a viewable elevation for a user standing upon said platform.

13. The apparatus according to claim 3, further comprising:
a second upstanding member associated with said anchor member for disposition of said second upstanding member at an opposite side of said platform; and
holding structure, associated with said second upright member, which is configured and arranged to hold a display terminal at a viewable elevation for a user standing upon said platform.

14. The apparatus according to claim 12, wherein:
said anchor member is adapted to receive a pair of platforms in side-by-side operable juxtaposition to enable a pair of users to simultaneously view said display terminal.

15. The apparatus according to claim 14, wherein:
said anchor member is configured and arranged for removable modular assembly to permit user modification effective to form either of a single-user or dual-user assembly.

16. A frame, for use with a removable switch-carrying platform during machine dance activity, comprising:
a horizontally disposed anchor member having a length between its front end and rear end that is sized at least in agreement with a corresponding size of said platform, a portion of said anchor member being disposed beneath an installed said platform;
a first upstanding member cantilevered from structure proximal said rear end of said anchor member; and
a trickbar supported by said first upstanding member for disposition of said trickbar at an elevation above said platform.

17. The frame according to claim 16, further comprising:
a tub configured to provide a socket in which to receive said platform, said tub providing a foundation effective to hold said platform above said anchor member, wherein:
edge structure disposed about a portion of a perimeter of said socket is arranged to provide a tapered transition, between a frame support surface and a top surface of said platform installed in said socket, effective to resist injury to an ankle of a user who steps upon said edge structure.

18. The frame according to claim 16, further comprising:
a second upstanding member cantilevered from structure proximal said front end of said anchor member; and
holding structure, associated with said second upright member, which is configured and arranged to hold a display terminal at a viewable elevation for a user standing upon said platform.

19. The frame according to claim 18, wherein:
said frame may be adapted to receive a pair of platforms in side-by-side operable juxtaposition to enable a pair of users to simultaneously view said display terminal.

20. The frame according to claim 19, wherein:
said frame is configured and arranged for removable modular assembly to permit user modification effective to form either of a single-user or dual-user assembly.

* * * * *